US011120816B2

(12) United States Patent
Freudenthal et al.

(10) Patent No.: US 11,120,816 B2
(45) Date of Patent: Sep. 14, 2021

(54) NATURAL EAR

(71) Applicant: Board of Regents, The University of Texas System, Austin, TX (US)

(72) Inventors: Eric A. Freudenthal, El Paso, TX (US); Eric M. Hanson, Buena Vista, VA (US); Bryan E. Usevitch, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 723 days.

(21) Appl. No.: 15/362,147

(22) Filed: Nov. 28, 2016

(65) Prior Publication Data

US 2017/0076738 A1    Mar. 16, 2017

Related U.S. Application Data

(63) Continuation-in-part of application No. 15/012,719, filed on Feb. 1, 2016, now Pat. No. 9,773,426.
(Continued)

(51) Int. Cl.
*G10L 21/0388* (2013.01)
*H04R 1/10* (2006.01)
(Continued)

(52) U.S. Cl.
CPC .......... *G10L 21/0388* (2013.01); *G09B 15/00* (2013.01); *G10H 1/44* (2013.01);
(Continued)

(58) Field of Classification Search
CPC ... G10L 21/0388; G10L 21/034; G09B 15/00; G10H 1/44; G10H 2210/066;
(Continued)

(56) References Cited

U.S. PATENT DOCUMENTS 4,039,753 A * 8/1977 Balogh ................ G10K 11/002
381/83
4,377,961 A * 3/1983 Bode .................... G01R 23/165
324/76.31
(Continued)

FOREIGN PATENT DOCUMENTS

JP           2601289 Y2 * 11/1999
JP         2016095350 A  *  5/2016

OTHER PUBLICATIONS

Gerhard, Pitch Extraction and Fundamental Frequency History and Current Techniques, Technical Report TR-CS 2003 (Year: 2003).*
(Continued)

*Primary Examiner* — Duc Nguyen
(74) *Attorney, Agent, or Firm* — Yee & Associates, P.C.

(57) ABSTRACT

Methods and systems for assisting tonally-challenged singers. A microphone can be integrated with a sound reinforcement system used in a live performance. The microphone, which can transduce the performer's voice, can serve multiple purposes such as, for example, to feed input to the natural ear and to the sound reinforcement system. The processed sound of the performer's voice (with fundamental frequencies emphasized) can be mixed into the signal fed to a stage "monitor" speaker facing the performer or a headset worn by the performer.

20 Claims, 9 Drawing Sheets

Related U.S. Application Data (60) Provisional application No. 62/110,592, filed on Feb. 1, 2015.

(51) Int. Cl.
  G10L 21/034 (2013.01)
  G10H 1/44 (2006.01)
  G09B 15/00 (2006.01)

(52) U.S. Cl.
  CPC .......... G10L 21/034 (2013.01); H04R 1/1016 (2013.01); *G10H 2210/066* (2013.01); *G10H 2210/331* (2013.01); *H04R 2201/107* (2013.01)

(58) Field of Classification Search
  CPC ............ G10H 2210/331; H04R 1/1016; H04R 2201/107; G10G 7/02; Y10S 84/18
  See application file for complete search history.

(56) References Cited

U.S. PATENT DOCUMENTS

| | | | | |
|---|---|---|---|---|
| 5,136,267 A | * | 8/1992 | Cabot | H03H 7/12 333/167 |
| 5,447,438 A | * | 9/1995 | Watanabe | G10H 1/36 369/47.23 |
| 5,567,162 A | * | 10/1996 | Park | G09B 15/00 434/307 A |
| 5,712,437 A | * | 1/1998 | Kageyama | G10H 1/366 84/610 |
| 5,876,213 A | * | 3/1999 | Matsumoto | G10H 1/366 381/63 |
| 7,974,838 B1 | * | 7/2011 | Lukin | G10L 21/04 704/207 |
| 9,317,561 B2 | | 4/2016 | Resch et al. | |
| 2004/0122664 A1 | * | 6/2004 | Lorenzo | H04M 1/6025 704/226 |
| 2004/0186708 A1 | * | 9/2004 | Stewart | G10L 25/90 704/207 |
| 2004/0194610 A1 | * | 10/2004 | Davis | H04R 5/04 84/466 |
| 2006/0027074 A1 | * | 2/2006 | Masuda | G10G 7/02 84/454 |
| 2006/0178876 A1 | * | 8/2006 | Sato | H03G 3/34 704/225 |
| 2009/0165634 A1 | * | 7/2009 | Mahowald | G10H 1/368 84/610 |
| 2009/0210220 A1 | | 8/2009 | Mitsuyoshi et al. | |
| 2010/0192753 A1 | * | 8/2010 | Gao | G10H 1/366 84/610 |
| 2013/0339025 A1 | | 12/2013 | Suhami | |
| 2014/0064519 A1 | * | 3/2014 | Silfvast | H04H 60/04 381/119 |
| 2014/0140536 A1 | * | 5/2014 | Serletic, II | G06F 3/0481 381/98 |
| 2015/0127349 A1 | | 5/2015 | Agiomyrgiannakis | |
| 2015/0350779 A1 | | 12/2015 | McNutt et al. | |
| 2016/0042657 A1 | | 2/2016 | Granger et al. | |
| 2016/0044429 A1 | | 2/2016 | Moffat | |
| 2016/0240181 A1 | | 8/2016 | McNutt | |
| 2016/0293041 A1 | | 10/2016 | Freudenthal et al. | |

OTHER PUBLICATIONS

U.S. Appl. No. 15/012,719, filed Feb. 1, 2016, Freudenthal et al.
Office Action/Non-Final Rejection dated Aug. 29, 2016, U.S. Appl. No. 15/012,719.
Amendment/Reply Filed Nov. 14, 2016, U.S. Appl. No. 15/012,719.

* cited by examiner

NATURAL EAR

CROSS-REFERENCE TO PATENT APPLICATION

This patent application is a continuation-in-part of U.S. patent application Ser. No. 15/012,719 entitled "Apparatus and Method to Reduce Tone Deafness," which was filed on Feb. 1, 2016, the disclosure of which is incorporated herein by reference in its entirety. U.S. patent application Ser. No. 15/012,719 claims priority to U.S. Provisional Patent Application No. 62/110,592, which was filed on Feb. 1, 2015, and is also incorporated herein by reference. This application therefore claims priority to the Feb. 1, 2015 filing date of U.S. Provisional Patent Application No. 62/110,592.

TECHNICAL FIELD

Tone deafness is defined as the inability to discern pitch. Many people who are unable to sing "on pitch" are not actually "tone deaf," but rather principally have difficulty discerning the pitch of their own utterances. Such people can be described as "tonally-challenged." The disclosed embodiments relate to techniques, methods, and devices that can enable people who are tonally-challenged to sing "on pitch." The embodiments can assist a person who is tonally-challenged to better comprehend the fundamental frequency and other aspects of their singing utterances, thereby enabling them to better sing "on pitch," either alone or in an ensemble with others.

BACKGROUND

Tone deafness is the inability to distinguish between musical notes that is principally not due to lack of musical training or education. Singers who want to sing a particular note N within their vocal range who can hear and discern the fundamental frequency within the note can generally tune their vocal cords to emit the note N. In contrast, singers who are tonally-challenged have difficulty discerning the fundamental frequency within the particular note and thus are generally not able to sing the note. While only 4% of the population is tone deaf (unable to perceive pitch), a much greater fraction of the population has trouble singing on pitch or "carrying a tune." We describe people who are not tone deaf but are unable to sing "on pitch" as tonally-challenged.

As such, a method and apparatus to allow tonally-challenged singers to identify the fundamental frequency in the note being sung so that they can sing the note is desired.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments, to provide for a method and apparatus that facilitates tonally-challenged people to sing "on pitch."

It is another aspect of the disclosed embodiments to provide for a microphone that can be utilized to detect a performer's voice and which serves multiple purposes.

It is yet another aspect of the disclosed embodiments to provide for a method and apparatus in, which the processed sound of a performer's Ice (with fundamental frequencies emphasized) can be mixed into a signal fed to a stage "monitor" speaker facing the performer or a headset worn by the performer.

It is still another aspect of the disclosed embodiments to provide a method and apparatus that facilitates tone-challenged performer's in singing intended notes with an option to reduce or eliminate a need for auto-tuning such notes.

The aforementioned aspects and other objectives and advantages can now be achieved as described herein. Methods and systems are disclosed for enabling tonally-challenged people to sing "on pitch." In an example embodiment, a singer can determine an intended frequency $f_i$ to sing a note. The singer sings a note continuously with fundamental frequency $f_u$. The "natural ear" device receives the sound, processes the sound to emphasize the fundamental frequency $f_u$, and outputs the sound to the auditory organs of the singer. The singer detects differences between intended frequency $f_i$ and uttered fundamental frequency $f_u$ and adjusts their vocal organs as they sing the note with the intention of changing $f_u$ to reduce the difference between $f_i$ and $f_u$.

In another example embodiment, an apparatus to facilitate singing on-pitch can include an input transducer that receives sound from the singer. The apparatus can also include an amplifier coupled to the input transducer that amplifies sound from the input transducer. The amplifier includes or is coupled to a filter that filters (e.g., a band-pass filter, a low pass filter, an adaptive filter, a notch filter, etc.) the sound from the input transducer. Such an apparatus can further include an output transducer coupled to the amplifier that receives the amplified and filtered sound. The output transducer generates amplified and filtered sound into the auditory organs of the singer.

In another example embodiment, the apparatus can include an input transducer that receives sound from the singer. The apparatus also includes a digital signal processor (DSP) coupled to the input transducer that accentuates fundamental frequency while attenuating distracting harmonics that could be confused for the singer's fundamental frequency. The apparatus further includes an output transducer coupled to the DSP that receives the sound. The output transducer generates sound processed by the DSP into the auditory organs of the singer.

In yet another example embodiment, a method and/or system for enabling people who are tonally-challenged to sing "on pitch" can include a microphone integrated with a sound reinforcement system used in a live performance. In some example embodiments, a sound transducing device can be utilized to transduce the performer's voice and can serve multiple purposes such as, for example, to feed input to the natural ear and to the sound reinforcement system. The processed sound of the performer's voice (with fundamental frequencies emphasized) can be mixed into the signal fed to a stage "monitor" speaker facing the performer or a headset worn by the performer.

Other aspects of the embodiments described herein will become apparent from the following description and the accompanying drawings illustrating the principles of the embodiments by way of example only.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. For example, preferred and alternative embodiments are disclosed herein.

Additionally, like numbers refer to identical, like or similar elements throughout, although such numbers may be referenced in the context of different embodiments. As used herein, the term "and/or" includes any and all combinations of one or more of the associated listed items. The terms "used" and "utilized" can be used interchangeably herein to refer to the same action (i.e., used or utilized).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection can be through a direct connection or through an indirect connection via other devices and connections. The fundamental frequency f depicted in frequency spectrum graph of sound is referred to as $f_u$ for shortening of notation.

The disclosed embodiments can be referred to collectively as a "natural ear" (NE) that is capable of being integrated in some scenarios into a sound reinforcement system used in live performance. The key idea of the disclosed NE is that the microphone used to detect the performer's voice can serve multiple purposes—potentially feeding (i.e., and potentially different forms of) to the natural ear's filtering components, for distribution to, for example, performers in order to assist them in better perceiving the fundamental pitch they are uttering and compare them with sounds produced by other performers; and also to assist other performers in perceiving the notes that other singers are uttering or playing on instruments during a performance. Portions or the entirety of the "natural ear" processing can be implemented utilizing functionality embedded in a sound reinforcement and live monitoring system.

The disclosed embodiments can thus augment some performers' ability to sing intended notes and harmonize with others, while potentially reducing or eliminating the need to auto-tune. Additionally, as gill be explained in greater detail herein, the sound transducing device (e.g., microphone) and emitting device (e.g., speaker) can be worn in the context of a wearable device or others/vise incorporated within the theatre/theatrical set and may be shared in some cases among multiple performers.

Figure 1:
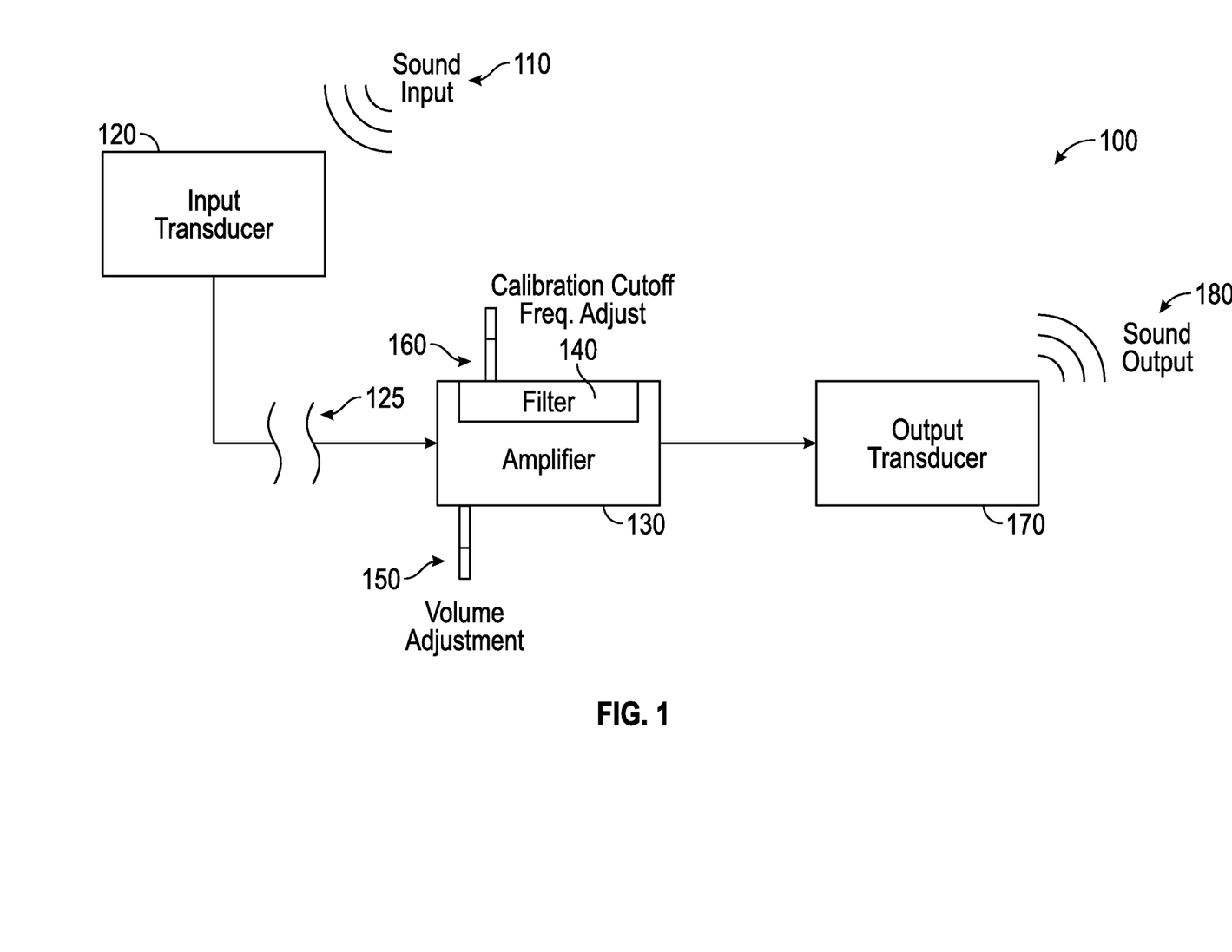
FIG. 1 illustrates a natural ear device that enables people who are "tonally-challenged" to sing "on pitch," in accordance with an example embodiment.
Figure 4:
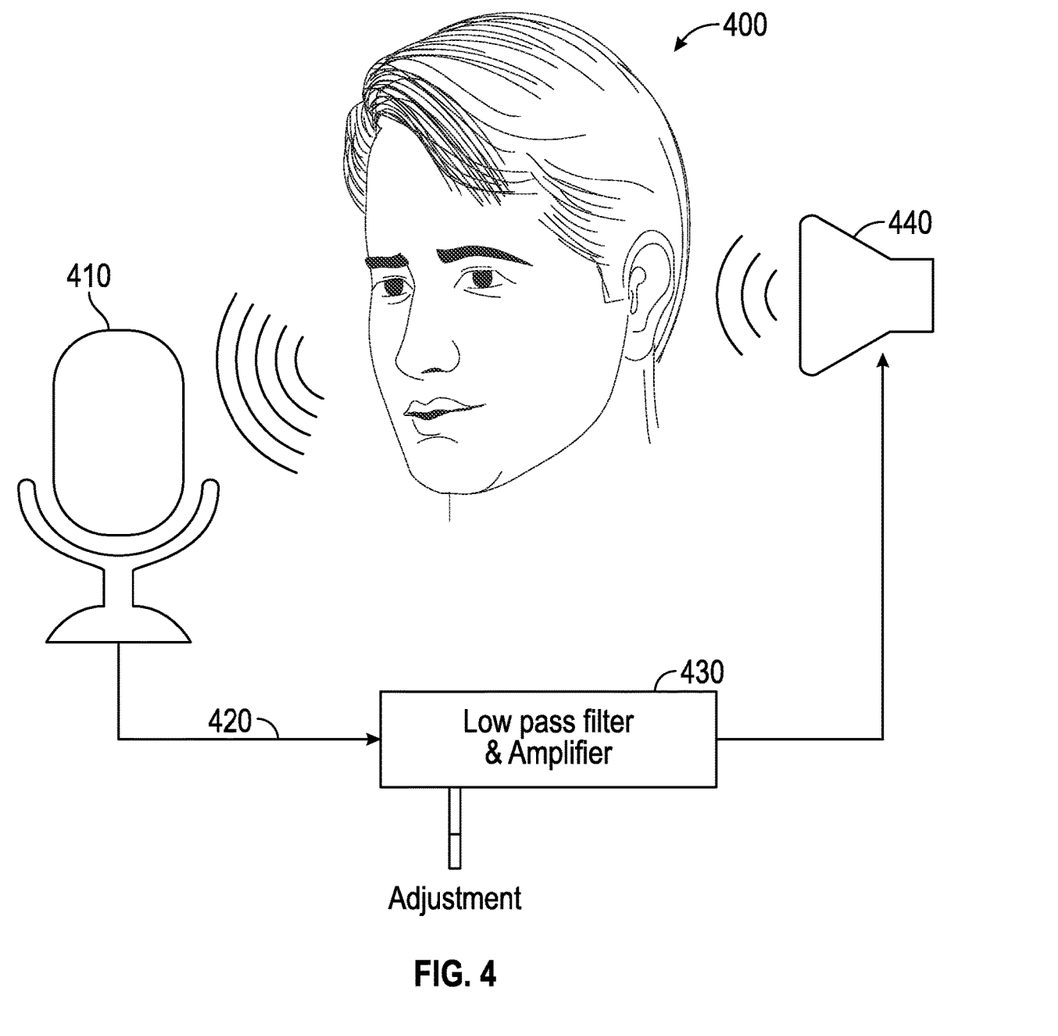
FIG. 4 illustrates the natural ear device shown in FIG. 1 in which a singer interacts with the device, in accordance with an example embodiment.

FIG. 1 illustrates a natural ear device 100 that can aid performers (e.g., singers) who are tonally-challenged, in accordance with an example embodiment. The singer creates sound at input 110 into an input transducer 120. In some example embodiments, the input transducer 120 can be implemented as a directional microphone 410 as shown in FIG. 4. In accordance with the example embodiment shown FIG. 1, the input transducer 120 couples to an amplifier 130 through a wireless connection 125, The wireless connection 125 can be, for example, a packet-based wireless communications protocol (e.g., a Bluetooth wireless connection) or a similar functionality connection. In accordance with other example embodiments, the input transducer 120 can couple to amplifier 130 through a wired connection (not shown in FIG. 1). In the example depicted in FIG. 4, the directional microphone 410 couples to a low pass filter and amplifier 430 (e.g., a filter and amplifier circuit) through a wired or wireless connection 420. Note that the term Bluetooth as utilized herein refers to a telecommunications industry specification that describes how mobile phones, computers, tablet computers, wearable computing devices, personal digital assistants (PDAs) and other computing devices can be easily interconnected using a short-range wireless connection.

Note that in some example embodiments, the low pass filter and amplifier 430 can be replaced with a band-pass filter and amplifier circuit. It should be appreciated that the use of a "low pass" filter is discussed herein for exemplary purposes only and that other types of filters and mechanisms may be utilized in place of a "low pass filter and amplifier". There are many approaches for emphasising the fundamental frequency of an utterance other than a low pass filter such as a band-pass filter, adaptive, notch, or even approaches that (1) detect the fundamental frequency and then (2) synthesize it back for the singer to hear. Thus, reference to a low pass filter herein is for illustrative purposes only and other types of filters (e.g., band-pass filter) can be utilized instead of a low pass filter.

Returning to FIG. 1, the amplifier 130 can include a control for volume adjustment 150 accessible to the singer. In accordance with some example embodiments, an integrated filter 140 within the amplifier 130 can be a low pass filter with a cutoff frequency $f_c$. In accordance with other embodiments not shown in the figures, amplifier 130 can be divided into two amplifiers. In such example embodiments, the amplifier 130 comprises a separate pre-amplifier that receives microwatt signals from the microphone and a power-amplifier capable of emitting sufficient wattage to power output transducer 170. Filter 140 can be between the pre-amplifier and the power amplifier.

In accordance with some example embodiments, the low pass filter 140 can include a cutoff frequency $f_c$ adjustment mechanism 160 that calibrates the natural ear for different singers. As each singer has a different fundamental frequency and second and third harmonic frequency based on age, whether male or female, style of singing and other physical characteristics, the adjustment mechanism 160 can be used to initially calibrate the cutoff frequency $f_c$ of low pass filter 140. As explained below, the cutoff frequency $f_c$ of the low pass filter for optimal performance of the natural ear might be between the second and third harmonic of the lowest note in the singer's vocal range. In addition, some embodiments may include dynamic filters (i.e., adaptive filters) as opposed to fixed filters. Such adaptive filters can automatically track and extract the fundamental frequency and potentially include some subset of the higher order harmonic frequencies as well. An adaptive filter can obviate the need to manually adjust the filter characteristics of the natural ear to match each singer.

In accordance with some alternative example embodiments of amplifier 130 and filter 140, a digital signal processor (DSP) can digitally process the sound signals from input transducer 120. The DSP can retain and amplify the fundamental frequency and even harmonics of the singer's voice while suppressing all other harmonics. The digital signal processor can be a Texas Instruments® or a similar OMAP DSP implementing the functionality of the amplifier and filter. As described in greater detail below, a DSP implementation can allow features such as auto calibration, surrounding noise reduction, and auto volume adjust to further clarify and enhance the fundamental frequency and even harmonics in the singer's voice.

In accordance with some example embodiments, amplified and filtered sound 180 emphasizing the fundamental frequency can be produced by output transducer 170. As shown in FIG. 4, in some example embodiments, the output transducer 170 can be a speaker 440, a headset (not shown), or wearable devices with similar functionality to the headset. Returning to FIG. 1, output transducer 170 is coupled to amplifier 130 and filter 140 via a wire but other embodiments may be a wireless connection (e.g., packet-based wireless communications).

Figure 2:
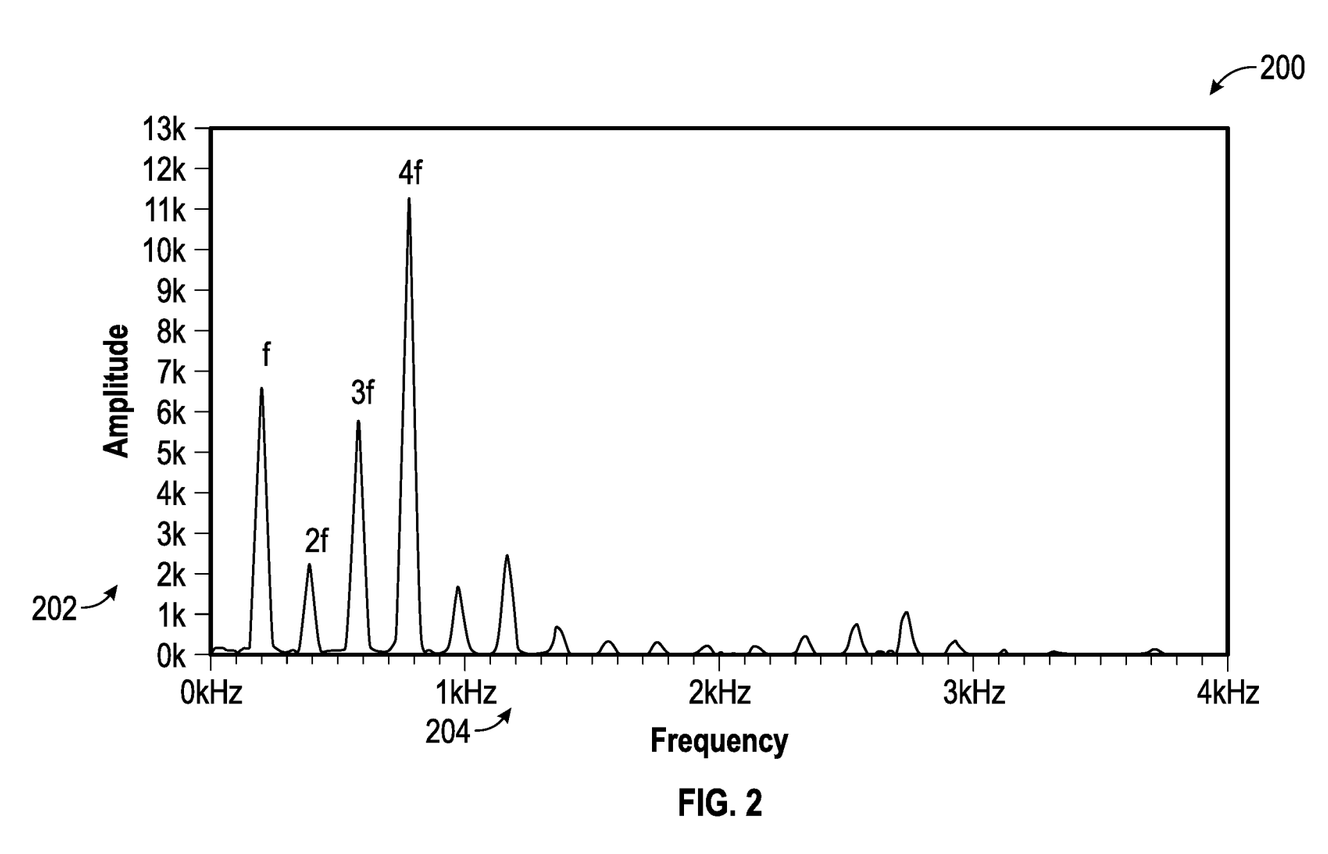
FIG. 2 illustrates a graph of the frequency spectrum of a singer's voice, in accordance with an example embodiment.

Turning now to FIG. 2, an exemplary frequency spectrum graph 200 of a singer's voice is illustrated. The example frequency spectrum graph 200 illustrated in FIG. 2 depicts data produced by a singers voice containing a fundamental frequency component f, second harmonic 2f, third harmonic 3f, fourth harmonic 4f, and so on until the amplitude of the harmonics become very small. The amplitude is indicated in FIG. 2 by the y-axis 202 and frequency is represented by the x-axis 204. After the sixth harmonic, the amplitude approaches close to zero. If a singer attempting to utter a note at frequency f incorrectly identifies a harmonic of their utterance at frequency f'=nf and n is not a power of two, the singer will sing a different note than intended and the result is likely to be unharmonious.

As explained above, singers who are tonally-challenged cannot clearly discern the fundamental frequency of a note from their own voices. Tonally-challenged singers frequently will improperly identify one or more odd harmonics as the fundamental frequency of the note. Thus, in FIG. 2 a tonally-challenged singer might identify the loud odd harmonic 3f as their fundamental frequency and sing with this unharmonious odd harmonic as their fundamental frequency. The natural ear device as described herein can create an artificial acoustic path from the mouth to ear that accentuates and amplifies the fundamental frequency. In accordance with some exemplary embodiments of this disclosure including a digital signal processor, the natural ear device can accentuate and amplify the fundamental frequency and even harmonics in the notes sung by the singer.

Figure 3:
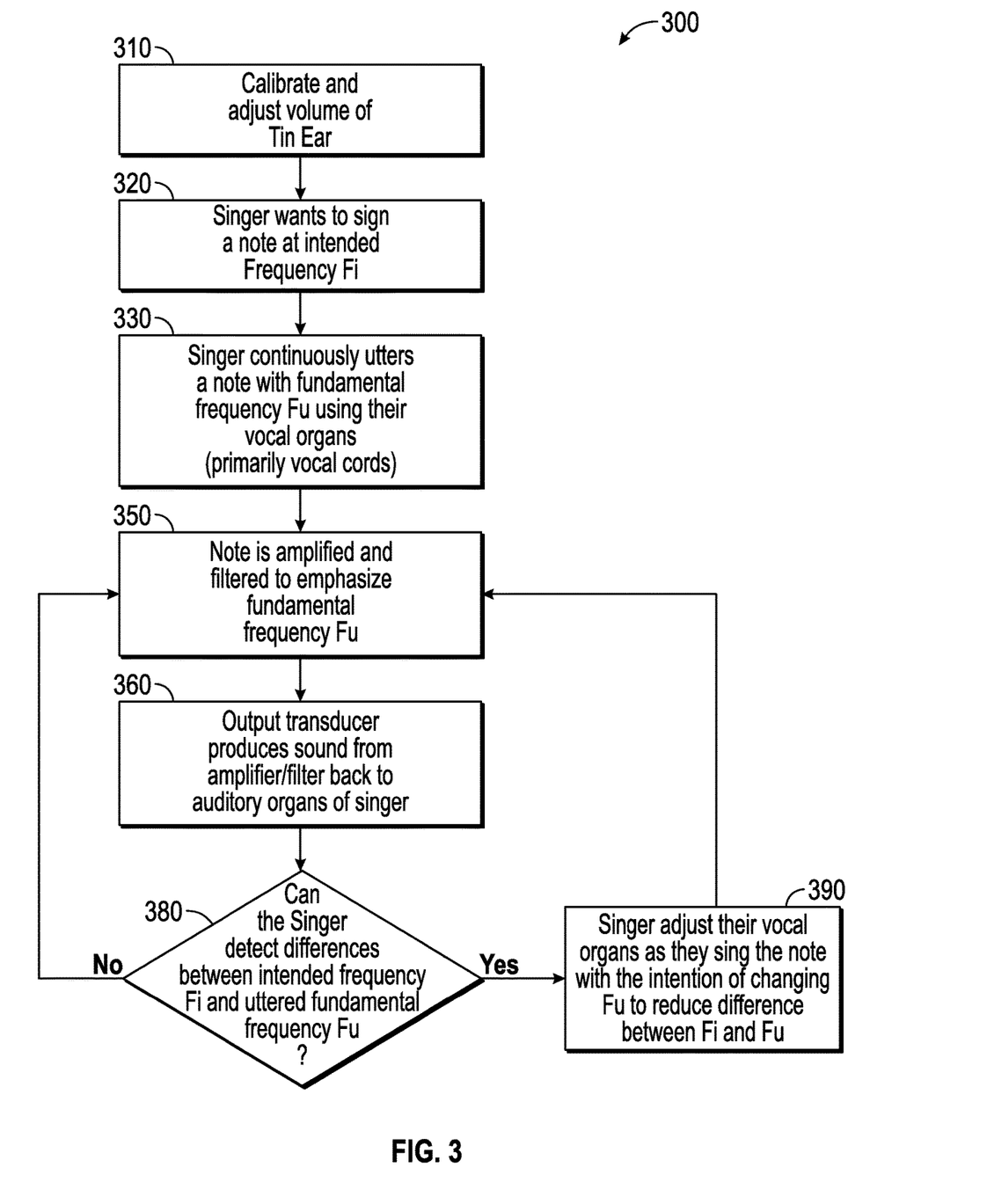
FIG. 3 illustrates a flow chart of operations depicting logical operational steps of a method for using and operating the natural ear device disclosed herein, in accordance with an example embodiment.

FIG. 3 illustrates a flow chart of operations depicting logical operational steps of a method 300 for using and operating the natural ear device disclosed herein, in accordance with an example embodiment. As indicated at block 310, the disclosed natural ear can be calibrated for the singer before the singer begins singing. In some example embodiments in which a digital signal processor replaces amplifier 130 and filter 140 shown in FIG. 1, an automatic calibration system can calibrate the natural ear to emphasize harmonious fundamental frequency and even harmonics of the singer's voice while attenuating odd harmonics. The automatic calibration system comprises the steps of placing the device into auto calibration mode and instructing the singer to sing various notes into input transducer 120. The DSP selects the proper frequencies that allow the singer to perceive the note (fundamental frequency) of their utterance as sound emitted by the output transducer 170. In some other example embodiments, manual calibration can be performed by a human operator who sets the cutoff frequency $f_c$ of the low pass filter 140. One strategy for manual calibration can comprise the steps of asking the singer to sing their lowest note at fundamental frequency f (e.g., see FIG. 2) and then setting the low pass filter cutoff frequency $f_c$ between f and 3f to strongly attenuate frequencies approaching and above either 2f or 3f.

Manual calibration of the natural ear in block 310 can include the manual adjustment of the volume control 150 (e.g., see FIG. 1) to a comfortable and effective level for the singer. As the singer is using the natural ear, they can further adjust the volume to an effective level. An automatic calibration system can initially auto adjust the volume level based on surrounding noise and then during use of the natural ear adjust the volume level based upon usage conditions and surrounding noise.

Following processing of the operation depicted at block 310 in FIG. 3, a determination can be made as shown at block 320 as to whether the singer wants to sing a note at an intended frequency $f_i$. The singer can begin to sing and continuously utter a note with fundamental frequency $f_u$ using their vocal organs, particularly their vocal cords, as depicted at block 330. Following the operation shown at block 330, the note can be amplified and filtered to emphasize the fundamental frequency $F_u$ as indicated at block 350. As the natural ear processes the sound, the singer continuously sings the note and does not stop or sings a sequence of utterances that the singer can correct based upon his or her perception of his or her utterances' frequencies.

As indicated thereafter at block 350, the frequencies in the note can be amplified and filtered to emphasize the fundamental frequency $f_u$. This emphasis may be implemented through the attenuation of other frequencies or through other means. Thereafter, as illustrated at block 360, the output transducer can produce sound into the auditory organs of the singer. If the singer does not detect differences between intended frequency $f_i$ and uttered fundamental frequency $f_u$, as shown at block 380, he or she continues to sing the note and process loops back to block 350. If the singer does detect differences between the intended frequency $f_i$ and uttered fundamental frequency $f_u$, the operation shown at block 390 is processed. As depicted at block 390, as the singer continues to sing the note, the singer can adjust their vocal organs with the intention of changing fundamental frequency $f_u$ to reduce the difference between $f_i$ and $f_u$ and the process then loops back to block 350.

In accordance with some example embodiments, the disclosed natural ear apparatus and process of use can assist a singer (or learner) to better comprehend the fundamental frequency $f_u$ and other aspects of their utterances, including assisting them in learning to match frequency and other aspects of others' singing.

Referring to FIG. 4, an exemplary embodiment of the natural ear device of FIG. 1 showing singer interaction with the device is illustrated. As shown in FIG. 4, a singer 400 utters a note into microphone 410. Microphone 410 is coupled to amplifier and low pass filter 430 through wired connection 420. The audio signal from microphone 410 is fed into the amplifier and low pass filter 430. Amplifier and low pass filter 430 accentuates and amplifies the fundamental frequency while suppressing other harmonics. An adjustment is present on the amplifier to increase the volume and in some embodiments as described above can be used during calibration to adjust the cutoff frequency $f_c$ of the low pass filter so that the filter passes the fundamental frequency and attenuates distracting harmonics. Speaker 440 couples to amplifier and low pass filter 430 through a wired connection. The amplifier and low pass filter 430 send a signal emphasizing fundamental frequency to speaker 440 that produces sound into the singer's ears.

Figure 5:
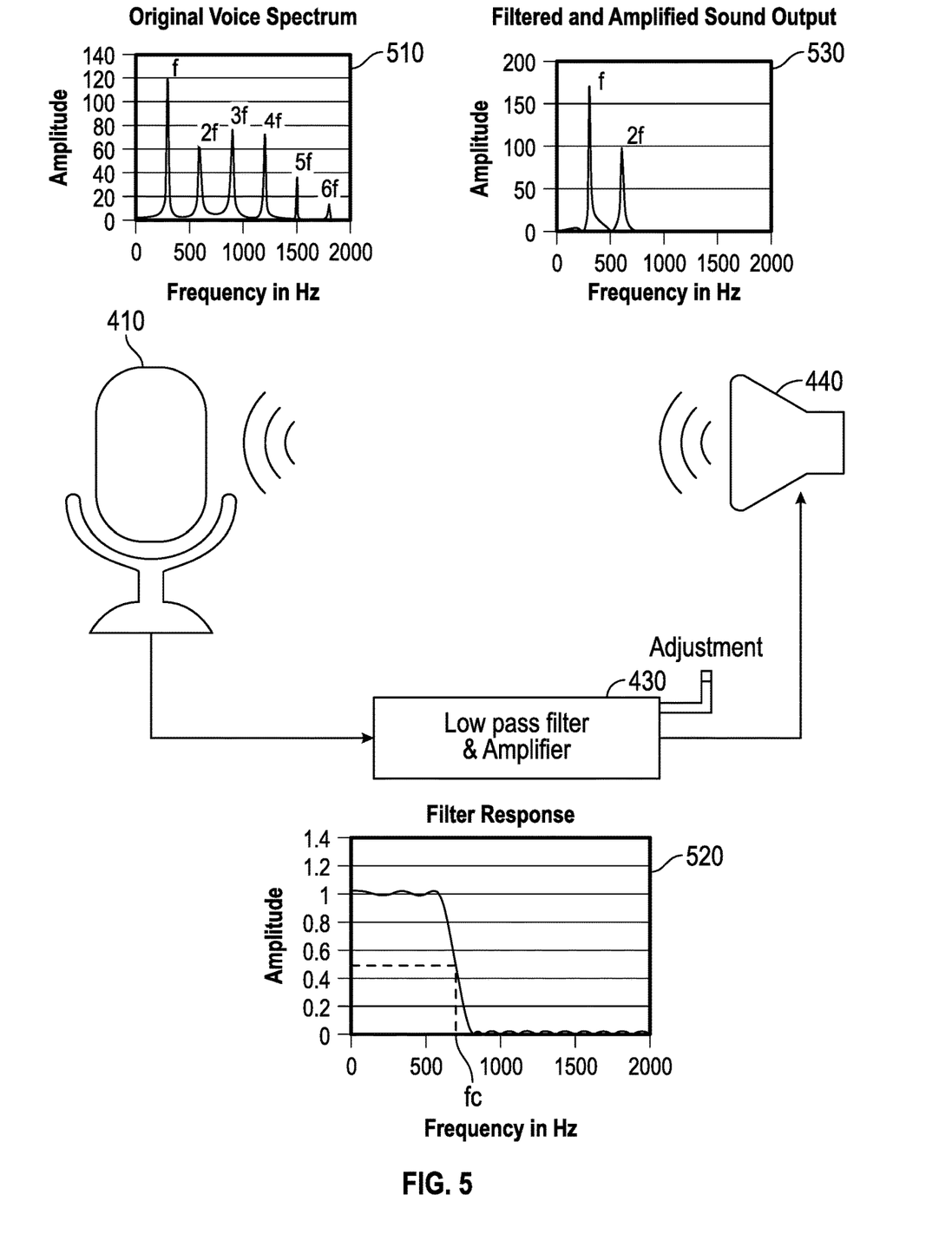
FIG. 5 illustrates potential amplitude versus frequency graphs of sound at input and output transducers and filter response, in accordance with an example embodiment.

FIG. 5 illustrates an exemplary embodiment of the natural ear device of FIG. 4 including the frequency spectrum of the sound at the microphone and speaker. FIG. 5 also depicts the frequency response 520 of the low pass filter 430. In FIG. 5, one singer's original voice spectrum 510 is depicted. This singer's voice spectrum includes a fundamental frequency component f at 300 Hz and harmonics at 2f (600 Hz), 3f (900 Hz), 4f (1200 Hz), 5f (1500 Hz), and 6 f (1800 Hz). The fundamental frequency component has an approximate amplitude of 120 and second harmonic 2f has an approximate amplitude of 65. The frequency response 520 of the low pass filter approximates one, that is pass through of the signal at the filter input to its output, up to a cutoff frequency $f_c$ of approximately 700 Hz. The cutoff frequency $f_c$ of a low pass filter can be defined as the frequency at which the filter reduces the input to one half its power at the filter output. In accordance with some embodiments of this disclosure, the cutoff frequency of the low pass filter is determined during calibration of the natural ear device for the singer as described above. In accordance with other embodiments, the cutoff frequency $f_c$ can be set during manufacture of the natural ear device for fundamental frequencies over a certain range or be adjustable via a control. Thus, natural ear devices sold to singers can specify on the packaging a range of fundamental frequencies to accommodate different singers. Note that a variety of filter types can be utilized in accordance with the disclosed embodiments. It can therefore be appreciated that the particular filters discussed herein are provided for exemplary purposes only and are not considered limited features of the disclosed embodiments.

Referring to the sound output in speaker 440 of FIG. 5, the frequency spectrum of the filtered and amplified output sound 530 is illustrated. Voice spectrum 510 is low pass filtered and amplified in device 430 to generate the filtered and amplified sound 530 at speaker 440. Based on the volume adjustment, the amplitude of the fundamental frequency component f at 300 Hz is approximately 170 and the second harmonic at 2f (600 Hz) is approximately 100. All other harmonics (3f, 4f, 5f, 6f, and so on) are attenuated by the low pass filter to a very small amplitude before reaching speaker 440. Thus, the singer hears the harmonious amplified fundamental and second harmonic and is able to compare this sound to the sound they desire at their intended frequency $f_i$.

Figure 6:
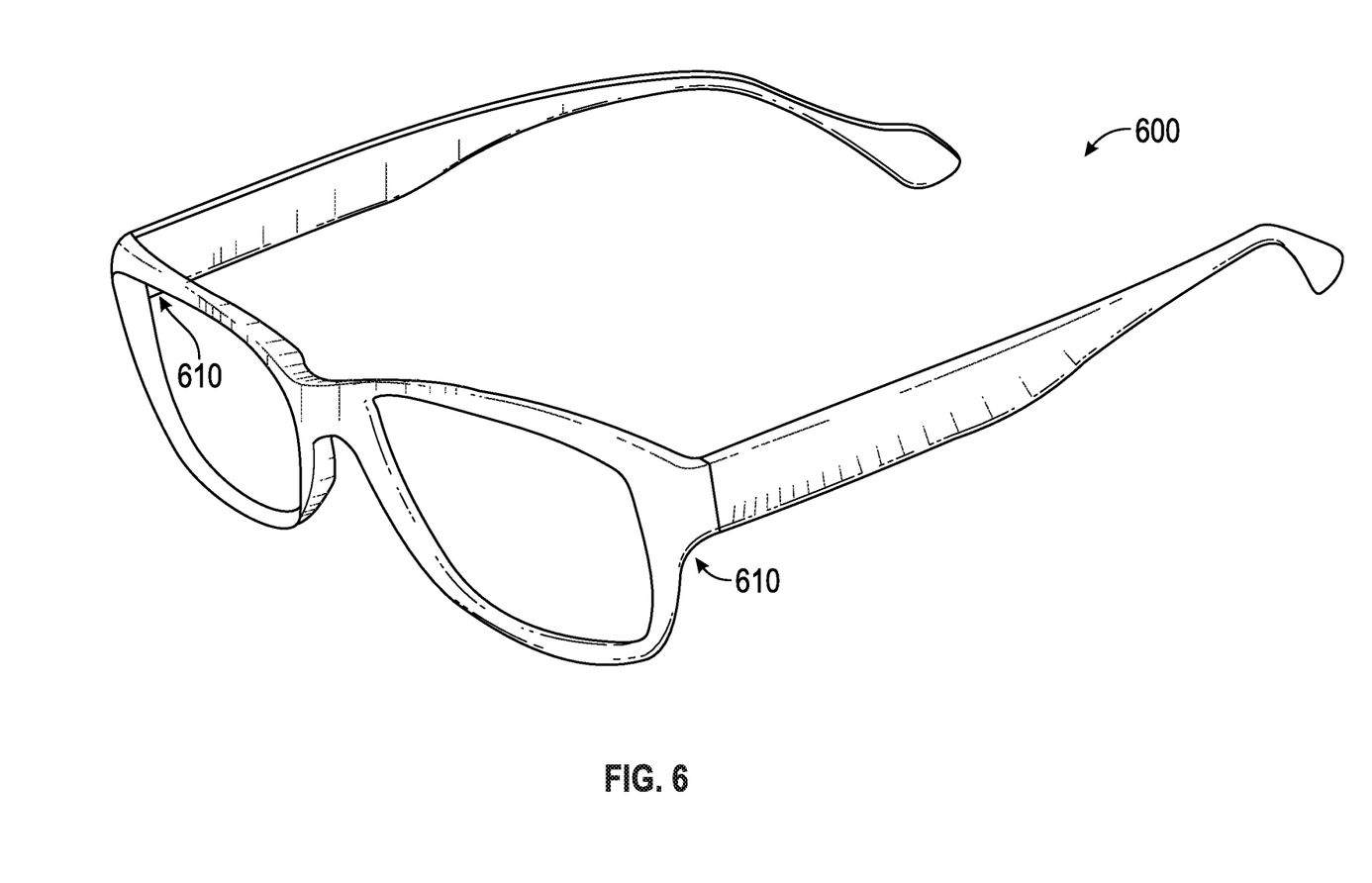
FIG. 6 illustrates a directional microphone array that can be incorporated into an eyeglass frame for use in a natural ear device, in accordance with an example embodiment.

Turning now to FIG. 6, in accordance with some example embodiments, a microphone, possibly embodied as microphone array 610 can be incorporated into an eyeglass frame 600 for use in the natural ear device. In some example embodiments not shown in FIG. 6, the directional microphone array can be attached to ordinary eyeglass frames and separable from the frames. The directional microphone array can electronically or acoustically implement a directional phase-array sensor aimed at the wearer's mouth to aid in rejecting sounds from other sources. Thus, the singer using the natural ear device in a group chorus can distinguish their own voice from the wide set of others' voices, allowing the singer to stay on tone and harmoniously sing on his intended frequency. In this manner, the natural ear helps those who have limited "self-hearing" capabilities.

Other wearable devices incorporating the directional microphone array can be earpiece devices and microphone attachments to the neck, back of the head or chest that are not visible to the audience.

In accordance with some embodiments of the present disclosure, amplifier and low pass filter 430 can be integrated into a wearable device such as the eyeglass frame 600 that also includes a microphone, possibly embodied as a directional microphone array. In other embodiments, incorporating a digital signal processor to accentuate and amplify the singer's fundamental frequency and harmonious frequency components, the DSP can be integrated into a wearable device or connected via wires or wireless link such as Bluetooth. Thus, in some embodiments as discussed below, a cell phone could be used to perform the signal processing, and then the device could also serve as a convenient cell headset useful for media content and phone calls.

Figure 7:
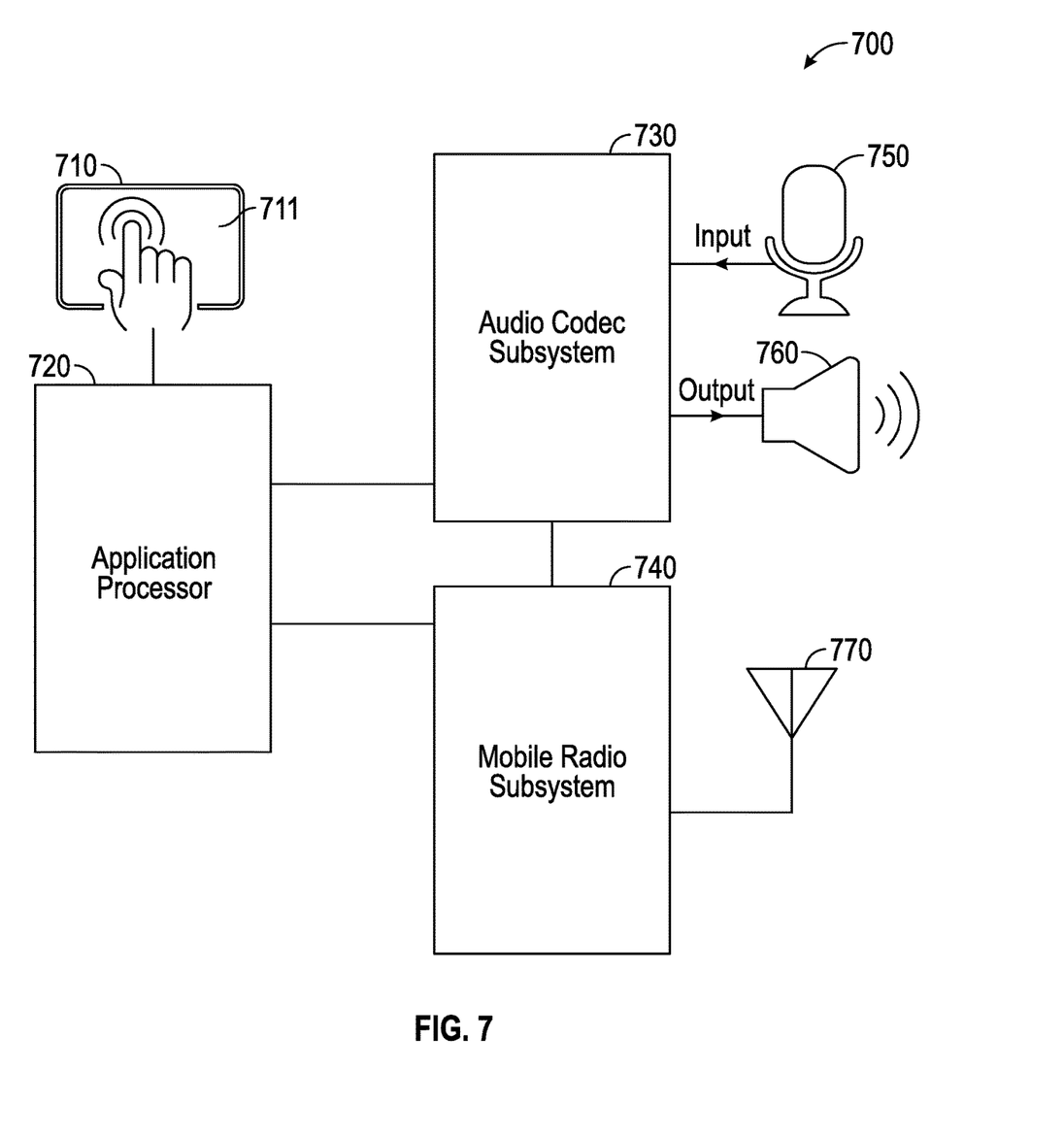
FIG. 7 illustrates a schematic diagram of a system that implements the disclosed natural ear device, in accordance with an example embodiment.

FIG. 7 illustrates a schematic diagram of a system 700 that can implement the disclosed natural ear device, in accordance with an example embodiment. FIG. 7 includes an application processor 720 that is operably connected to and/or communicates with an audio codec subsystem 730 and a mobile radio subsystem 740. A computing device 710 can provide, for example, a touch screen user interface 711 that allows the singer to select the natural ear application software. Such an application can be executed in application processor 720, which in some example embodiments can utilize a digital signal processor from Texas Instruments®, Cirrus Logic®, Inc., or other manufacturer.

The application processor 720 can couple to the mobile radio subsystem 740, which can receive and transmit voice and data signals for a cellular phone (e.g., such as a smartphone) or another computing device, such as, for example, a tablet computing device. The mobile radio subsystem 740 couples to an antenna 770 for receiving and transmitting voice and data signals that in some example embodiments can be incorporated into the cellular phone body and not as a separate antenna. Application processor 720 and mobile radio subsystem 740 couple to audio codec subsystem 730. Microphone 750 receives sound from a singer that is input to audio codec 730. Speaker 760 receives amplified and filtered sound from audio codec subsystem 730. In accordance with some embodiments of this disclosure, audio codec subsystem 730 can comprise circuitry to implement a digital low pass filter and amplifier. In accordance with other example embodiments, the audio codec subsystem 730 can be implemented as a secondary DSP that includes functionality to emphasize the fundamental frequency while attenuating distracting harmonics.

The audio codec subsystem 730 can implement a singer specific calibration system for the natural ear device as described in more detail above with reference to FIG. 3. Exemplary embodiments of the application processor 720, mobile radio subsystem 740, and audio codec subsystem 730 for implementation of the natural ear device are shown and described in, for example, "Unleashing the Audio Potential of Smartphones: Dedicated Audio ICs Like Smart Audio Codecs and Hybrid Class-D Amplifiers Can Help Solve System Level Challenges" by Rob Kratsas, Cirrus Logic, Inc., Austin, Tex., which is incorporated herein by reference in its entirety.

Figure 8:
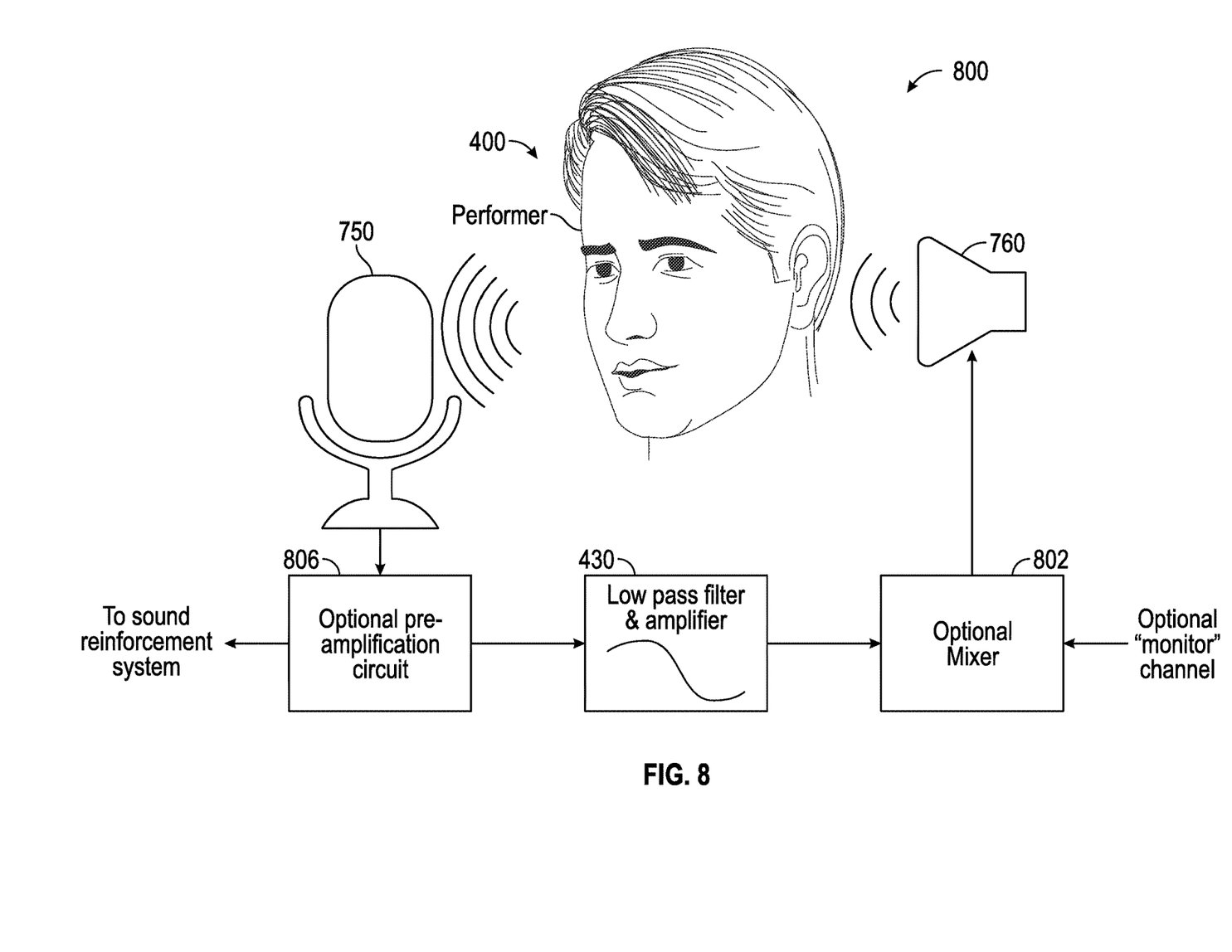
FIG. 8 illustrates a block diagram of a system that can be utilized to enable people who are "tonally-challenged" to sing "on pitch," in accordance with another example embodiment.

FIG. 8 illustrates a block diagram of a system 800 that can be utilized to facilitate a "tonally-challenged" person to sing "on pitch." The system 800 generally includes a microphone 750 (e.g., such as the microphone 750 depicted in FIG. 7) and a speaker 760. Output from the microphone 750 can be provided to an optional pre-amplification circuit 806 that can provide output to a lower pass filter and amplifier circuit 430 and a sound reinforcement system. Output from the low pass filter amplifier circuit 430 can be provided as input to an optional mixer 802 that also receives as input an optional "monitor" channel. Output from the mixer 802 can then be fed to the speaker 760.

The "natural ear" device described herein with respect to various example embodiments can assist singers who have difficulty discerning which pitch frequency is the fundamental frequency or "correct" pitch frequency either when they are listening to music or singing. The natural ear apparatus provides the ability to hear one's own voice externally without the distractions of how the voice is filtered by the bones, sinuses, tissue, etc., inside of the head. Filtering present in the natural ear device allows removal of distractions present in the pitch itself, limiting the overtones that are produced, and reducing the sound to its formant, or fundamental pitch frequency. It should be noted, however, that a formant is likely a distracting overtone and not what the disclosed "natural ear" system will principally augment.

It should be appreciated that some aspects of the disclosed embodiments can be carried out by software including computer program code. In some example embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, IEEE 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. FIG. 3, for example, depicts a detailed flow chart of operations with blocks containing examples of instructions or steps. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 9:
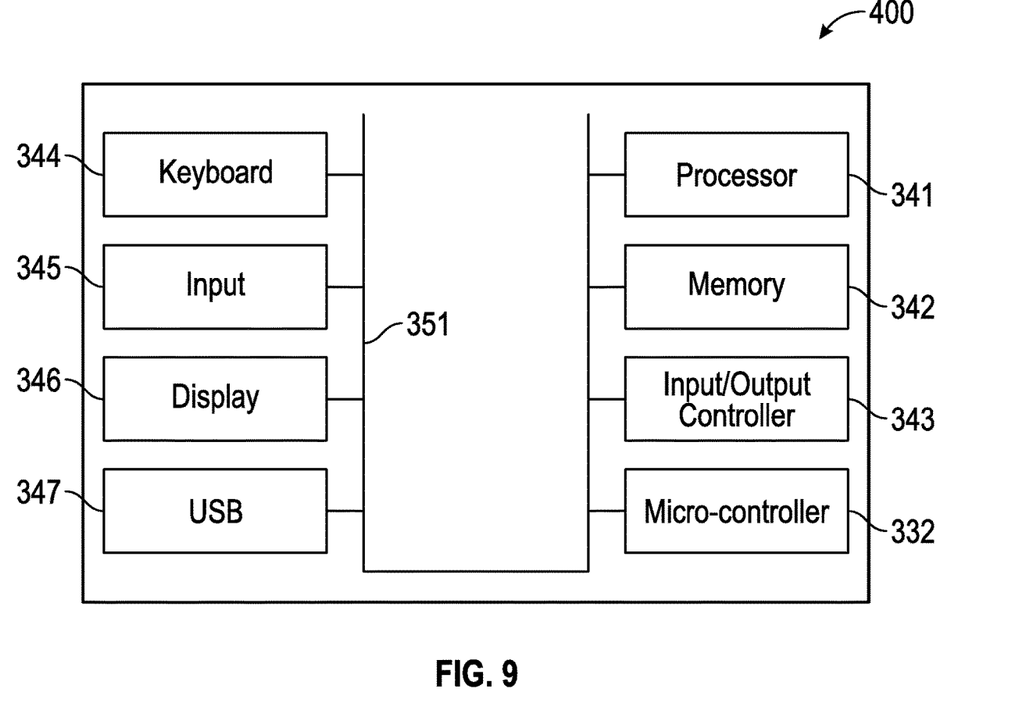
FIG. 9 illustrates a computer software system for directing the operation of the data-processing system, in accordance with an example embodiment.
Figure 10:
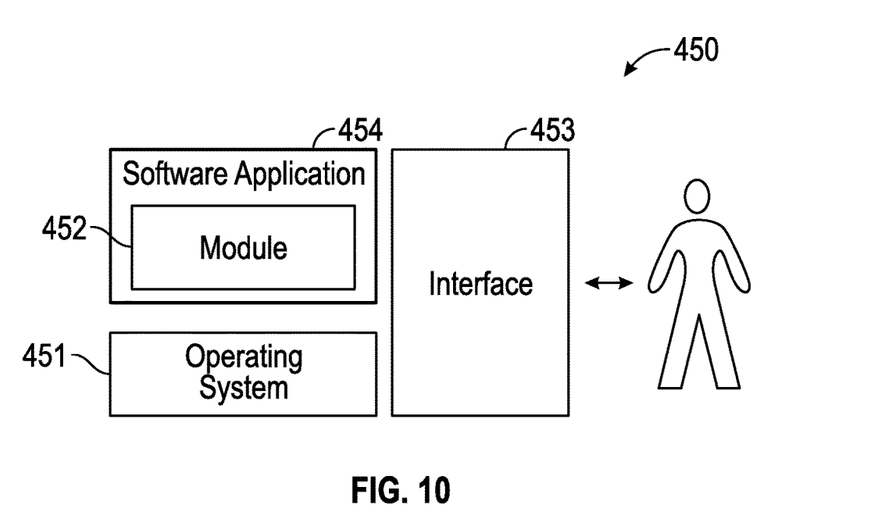
FIG. 10 illustrates a schematic view of a software system including a module, an operating system, and a user interface, in accordance with an example embodiment.

FIGS. 9-10 are provided as exemplary diagrams of data-processing environments in which embodiments may be implemented. It should be appreciated that FIGS. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, some embodiments may be implemented in the context of a data-processing system 400 that can include one or more processors such as a processor 341, a memory 342, a controller 343 (e.g., an input/output controller), a peripheral USB (Universal Serial Bus) connection 347, a keyboard 344 or other input device (e.g., a physical keyboard or a touch screen graphically displayed keyboard), an input component 345 (e.g., a pointing device, such as a mouse, track ball, pen device, which may be utilized in association or with the keyboard 344, etc.), a display 346, and in some cases, a micro-controller 332. Data-processing system 400 may be, for example, a client computing device (e.g., a client PC, laptop, tablet computing device, a wearable computing device, etc.), which communicates with peripheral devices (not shown) via a client-server network (e.g., wireless and/or wired). In still other example embodiments, the data-processing system can be implemented as a server in the context of a client-server network or other server-based network implementation.

In some example embodiments, the processor 341 may function, for example, as the application processor 720 shown in FIG. 7, and the display 346 may graphically display, for example, the touch screen user interface 711 of the computing device 710 shown in FIG. 7. The data-processing system 400 can implement the computing device 710 shown in FIG. 7. In some example embodiments, the data-processing system 400 may be implemented as or in the context of a wearable computing device—a miniature electronic device that can be worn by a user. Examples of wearable computing devices include, but are not limited to, so-called smartwatches, optical head-mounted displays (e.g., Google Glass, augmented reality devices, etc.).

As illustrated, the various components of data-processing system 400 can communicate electronically through a system bus 351 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be implemented in some embodiments, for example, as a standalone desktop computer, a laptop computer, a Smartphone, a pad computing device, a server, and so on.

FIG. 10 illustrates a computer software system 450 for directing the operation of the data-processing system 400 shown in FIG. 9, in accordance with an example embodiment. Software application 454, stored for example in memory 342, generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as, for example, a module 452 (or a module composed of a group of modules), which can, for example, implement instructions or operations such as those described herein. Examples of instructions that can be implemented by module 452 include steps or operations such as those shown and described herein with respect to the various blocks and operations shown in FIG. 3 and described elsewhere herein. Module 452 can include sub-modules such as, for example, the various blocks or modules shown in FIGS. 7-8.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" such as module 452 shown in FIG. 10 constitutes a software application. However, a module may also be composed of, for example, electronic and/or computer hardware or such hardware in combination with software. In some cases, a "module" can also constitute a database and/or electronic hardware and software that interact with such a database.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those described herein can be implemented in the context of such a module or modules, sub-modules, and so on.

FIGS. 9-10 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any example embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments can include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages can be provided by different embodiments.

Based on the foregoing, it can be appreciated that a number of preferred and alternative embodiments are disclosed herein. For example, in one embodiment, a system for assisting tonally-challenged singers can be implemented. Such a system can include a sound transducing device that transduces a voice of a singer, and a filter and amplifier circuit that receives a signal produced by the voice of the performer from the sound transducing device and filters and amplifies the signal so that fundamental frequencies of the voice of the singer are accentuated, thereby allowing the singer to self-monitor the voice and augment an ability of the singer to sing intended notes and harmonize with others and potentially reduce or eliminate a need for auto-tuning.

In some example embodiments, the aforementioned filter can be a band-pass filter as discussed previously. In other example embodiments, the filter may be a low pass filter. In still example other embodiments, the filter may be an adaptive filter. In yet other example embodiments, the filter may be a notch filter. In another example embodiment, the filter may be implemented as or in the context of a mechanism that detects the fundamental frequencies and then synthesizes the fundamental frequencies back for the singer to hear.

In another example embodiment, the aforementioned sound transducing device can be implemented as a microphone. In another example embodiment, a sound emitting device can be provided in association with the sound transducing device. In some example embodiments, the sound emitting device and/or the sound transducing device are incorporated and configured within one or more wearable devices (see the previous discussion herein regarding wearable devices). Note that the in some embodiments, the entire "natural ear" system disclosed herein can be wearable, or in other embodiments, not wearable (e.g., a microphone on a stand and a loudspeaker mounted on a stand).

The aforementioned sound transducing device together with the filter and amplifier circuit allows the singer to better perceive a fundamental pitch with respect to the voice being uttered by the singing and compare with sounds produced by other performers.

In another example embodiment, an optional pre-amplifier circuit can be provided, which receives and pre-amplifies the signal for input to the filter and amplifier circuit and/or to a sound reinforcement system. In yet another example embodiment, an optional mixer can be implemented, which receives as input the signal after filtering and amplification of the signal through the filter and amplification circuit and optionally receives as input another signal indicative of a monitor channel and mixes the signals for output through the sound emitting device.

In another example embodiment, a method for assisting tonally-challenged singers can be implemented. Such an example method can includes steps, operations, or instructions including: detecting a voice of a singer with a sound transducing device; receiving a signal produced by the voice of the performer from the sound transducing device; and filtering and amplifying the signal with a filter and amplifier circuit so that fundamental frequencies of the voice of the singer are accentuated, thereby allowing the singer to self-monitor the voice and augment an ability of the singer to sing intended notes and harmonize with others and potentially reduce or eliminate a need for auto-tuning.

In yet another example embodiment, a system for assisting tonally-challenged singers can be implemented which includes one or more processors and a computer-usable medium embodying computer program code. The computer-usable medium capable of communicating with the processor(s), and computer program code can include instructions executable by the processor(s) and configured for: detecting a voice of a singer with a sound transducing device; receiving a signal produced by the voice of the performer from the sound transducing device; and filtering and amplifying the signal with a filter and amplifier circuit so that fundamental frequencies of the voice of the singer are accentuated, thereby allowing the singer to self-monitor the voice and augment an ability of the singer to sing intended notes and harmonize with others and potentially reduce or eliminate a need for auto-tuning.

In another example embodiment, the disclosed "natural ear" device/system can be integrated into a headset worn by, for example, a Karaoke singer. In such an example embodiment, the headset's microphone can also feed into the PA system, and the headset's speaker can optionally include recorded audio and/or other voices.

Finally, it should be noted that while an "utterance" has only one fundamental frequency, some embodiments of the disclosed "natural ear" system can be configured, which accentuate not only the fundamental, but also harmonics that represent the same note in a higher octave. In particular, if the fundamental is at a frequency f, all frequencies $2^i f$ are the same note but in differing octaves for all integer i greater than 1. We consider these harmonics on the same note as the fundamental to be less "distracting" than harmonics that are at different notes. Thus, some example embodiments can be designed, which accentuate f and potentially some of these "less distracting" higher harmonics.

It also be noted again that there many approaches for emphasizing the fundamental frequency of an utterance other than low pass filter such as a band-pass, adaptive, notch, or even approaches that (1) detect the fundamental frequency and then (2) synthesize it back for the singer to hear, and that such approaches can be implemented in accordance with varying embodiments.

It will be appreciated that variations of the above-disclosed and other features and functions, or alternatives thereof, may be desirably combined into many other different systems or applications. It will also be appreciated that various presently unforeseen or unanticipated alternatives, modifications, variations, or improvements therein may be subsequently made by those skilled in the art, which are also intended to be encompassed by the following claims.

What is claimed is:

1. A system for assisting tonally-challenged singers, said system comprising:
   a sound transducing device that transduces a voice of a singer; and
   a filter and amplifier circuit that receives a signal produced by said voice of said performer from said sound transducing device and filters and amplifies said signal so that fundamental frequencies of said voice of said singer are accentuated, thereby allowing said singer to self-monitor said voice and augment an ability of said singer to sing intended notes and harmonize with others and potentially reduce or eliminate a need for auto-tuning.

2. The system of claim 1 wherein said filter of said filter and amplifier circuit comprises at least one of the following:
   a band pass filter;
   a low pass filter;
   an adaptive filter;
   a notch filter;
   a mechanism that detects said fundamental frequencies and then synthesizes said fundamental frequencies back for said singer to hear; or
   a component that effectively accentuates said fundamental frequencies of a spoken utterance or sung utterances of said singer and/or suppresses distracting harmonics.

3. The system of claim 1 wherein said sound transducing device comprises a microphone.

4. The system of claim 1 further comprising a sound emitting device in association with said sound transducing device.

5. The system of claim 4 wherein said sound emitting device and/or said sound transducing device are incorporated and configured within at least one wearable device.

6. The system of claim 1 wherein said sound transducing device together with said filter and amplifier circuit allows said singer to better perceive a fundamental pitch with respect to said voice being uttered by said singing and compare with sounds produced by other performers.

7. The system of claim 1 further comprising an optional pre-amplifier circuit that receives and pre-amplifies said signal for input to said filter and amplifier circuit and/or to a sound reinforcement system.

8. The system of claim 4 further comprising an optional mixer that receives as input said signal after filtering and amplification of said signal through said filter and amplification circuit and optionally receives as input another signal indicative of a monitor channel and mixes said signals for output through said sound emitting device.

9. A method for assisting tonally-challenged singers, said method comprising:
   detecting a voice of a singer with a sound transducing device;
   receiving a signal produced by said voice of said performer from said sound transducing device; and
   filtering and amplifying said signal with a filter and amplifier circuit so that fundamental frequencies of said voice of said singer are accentuated, thereby allowing said singer to self-monitor said voice and augment an ability of said singer to sing intended notes and harmonize with others and potentially reduce or eliminate a need for auto-tuning.

10. The method of claim 9 wherein said filter of said filter and amplifier circuit comprises at least one of the following:
    a band pass filter;
    a low pass filter;
    an adaptive filter;
    a notch filter;
    a mechanism that detects said fundamental frequencies and then synthesizes said fundamental frequencies back for said singer to hear; or
    a component that effectively accentuates said fundamental frequencies of a spoken utterance or sung utterances of said singer and/or suppresses distracting harmonics.

11. The method of claim 9 wherein said sound transducing device comprises a microphone.

12. The method of claim 9 further comprising associating a sound emitting device with said sound transducing device.

13. The method of claim 12 wherein said emitting device and/or said sound transducing device are incorporated and configured within at least one wearable device.

14. The method of claim 9 wherein said sound transducing device together with said filter and amplifier circuit allows said singer to better perceive a fundamental pitch with respect to said voice being uttered by said singing and compare with sounds produced by other performers.

15. The method of claim 9 further comprising receiving and pre-amplifying said signal with an optional pre-amplifier circuit for input to said filter and amplifier circuit and/or to a sound reinforcement system.

16. The method of claim 12 further comprising:
    receiving as input said signal with an optional mixer after filtering and amplification of said signal through said filter and amplification circuit;
    optionally receiving as input another signal indicative of a monitor channel; and
    mixing said signals for output through said sound emitting device.

17. A system for assisting tonally-challenged singers, said system comprising:
    at least one processor; and
    a computer-usable medium embodying computer program code, said computer usable medium capable of communicating with said at least one processor, said computer program code comprising instructions executable by said at least one processor and configured for:
    detecting a voice of a singer with a sound transducing device;
    receiving a signal produced by said voice of said performer from said sound transducing device; and
    filtering and amplifying said signal with a filter and amplifier circuit so that fundamental frequencies of said voice of said singer are accentuated, thereby allowing said singer to self monitor said voice and augment an ability of said singer to sing intended notes and harmonize with others and potentially reduce or eliminate a need for auto-tuning.

18. The system of claim 17 wherein said filter of said filter and amplifier circuit comprises at least one of the following: a band pass filter, a low pass filter, an adaptive filter, a notch filter, or a mechanism that detects said fundamental frequencies and then synthesizes said fundamental frequencies back for said singer to hear.

19. The system of claim 17 further comprising an optional pre-amplifier circuit that receives and pre-amplifies said signal for input to said filter and amplifier circuit and/or to a sound reinforcement system.

20. The system of claim 17 further comprising an optional mixer that receives as input said signal after filtering and amplification of said signal through said filter and amplification circuit and optionally receives as input another signal indicative of a monitor channel and mixes said signals for output through a sound emitting device.

* * * * *